United States Patent Office 3,415,143
Patented Dec. 10, 1968

3,415,143
DEVIATED DEFLECTION HARMONIC DRIVE
Shoichi Ishikawa, Yokohama-shi, Japan, assignor, by mesne assignments, to United Shoe Machinery Corporation, Flemington, N.J., a corporation of New Jersey
Filed Oct. 12, 1966, Ser. No. 586,190
Claims priority, application Japan, Oct. 20, 1965, 40/63,904
3 Claims. (Cl. 74—640)

ABSTRACT OF THE DISCLOSURE

In prior transmissions of the type employing strain wave gearing, a radially deflectible gear or flexspline cooperating with a coaxial circular spline or reaction gear has tooth contacts at the major axis (assuming a wave generator internal of the flexspline), but there is meshing in adjacent areas without tooth contact. Such "non-deviated" arrangements employ a deflection (i.e. half the difference between major and minor axes) equal to the quotient of the pitch diameter of the undeflected flexspline and the gear ratio. The present disclosure provides for a flexspline having a "deviation" from such deflection resulting in tooth contact at points or areas ahead of or behind the major axis, and meshing but no contact at the major axis. Consequent advantages, depending on whether the deviation be positive or negative, include overcoming of tooth ratcheting, for instance, or effecting a lower gear ratio with reduced stresses.

---

This invention relates to strain wave gearing, some times termed harmonic drive transmission, wherein a radially deflectible splined member meshes progressively at spaced circumferential localities with a coaxial circular spline. More particularly this invention is concerned with provision of a novel, modified form of harmonic drive gearing wherein, for the attainment of certain advantages, the degree of radial deflection of a flexspline is selected within a range less or greater than the standard deflection hitherto specified for cooperation with a given circular spline.

For background information reference may be had to United States Letters Patent 2,906,143 and 2,959,065 (amongst others) granted upon applications filed in the name of C. Walton Musser. The first of these discloses harmonic drive having a pair of coaxial gears one of which is deflectible, both having teeth of the same circular pitch but differing in numbers of teeth and in pitch diameter. The second discloses a so-called dynamic spline differing from the foregoing in that the number of spline teeth on the deflected gear is equal to that on the circular spline. While the present invention is especially directed to the deflectible gear or flexspline as will be described, it will be understood that the wave generating means for effecting its lobar shape and rotating the circumferential radial displacement therein may be any of various mechanical, electromagnetic, or hydraulic types previously disclosed. Moreover, as heretofore, the wave shape employed may be elliptoidal or utilize more than two lobes symmetrical about the center of rotation. It will also be understood that, as is well known, any one of the three basic elements, wave generator, flexspline, or circular spline, may serve as input and another serves as output, with the third usually serving as a reaction member.

A primary purpose of this invention is to enable a harmonic drive transmission to have more latitude in its design and hence in its construction.

Another purpose is to attain advantages which can be derived in operation when the flexspline has a circular pitch which differs from that of the cooperating circular spline, and their spline teeth respectively differ in number.

Still another purpose is to provide a novel harmonic drive transmission design having a lower reduction ratio and one wherein flexural stress may be less than in non-deviated harmonic drive.

To these ends a main feature of the invention resides in the provision of a harmonic drive transmission having a circular spline and a radially deflected coaxial flexspline having teeth meshing and engaging at spaced circumferential localities, the deflection of the flexspline being such that, at the localities of full meshing, instead of both faces of a flexspline tooth engaging the adjacent sides of circular spline teeth in harmonic drives heretofore, the tooth engagement is deviated to one or the other side of the apex of the engaged portions of the flexspline so that one face only of a flexspline tooth engages a circular spline tooth.

The foregoing and other features of the invention, together with a novel method for making harmonic drives in a range of reduction ratios, will now be set forth with greater particularity in connection with an illustration embodiment and with reference to the accompanying drawings, in which.

It will be understood that, although the invention is applicable to arrangements wherein the flexspline is external of the circular spline, the invention will for convenience now be described only as related to the arrangement wherein the flexspline is internal of the circular spline.

Figure 1:
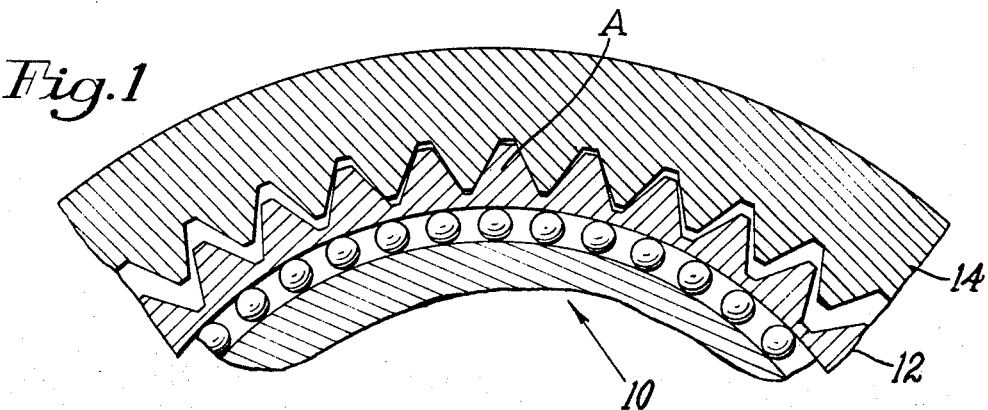
FIG. 1 is an enlarged transverse section of fully meshed portions of an elliptoidal flexspline and its external circular spline according to known harmonic drive construction.
Figure 2:
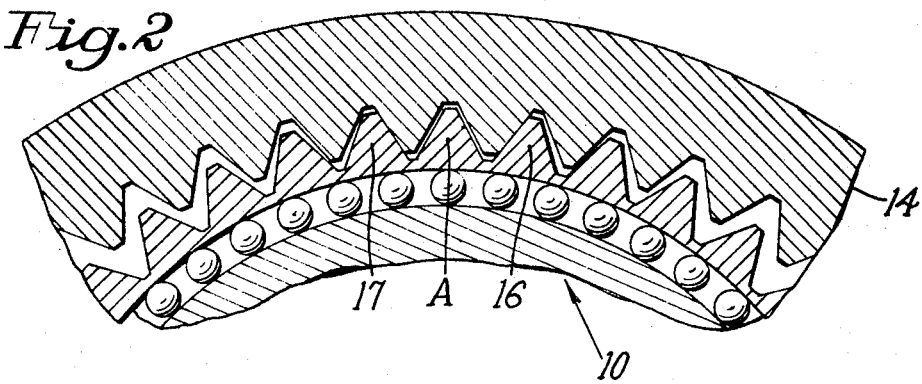
FIG. 2 is a section corresponding to FIG. 1 but as applied to similar transmission members in accordance with the present invention, the flexspline teeth having positive deviation or displacement.
Figure 3:
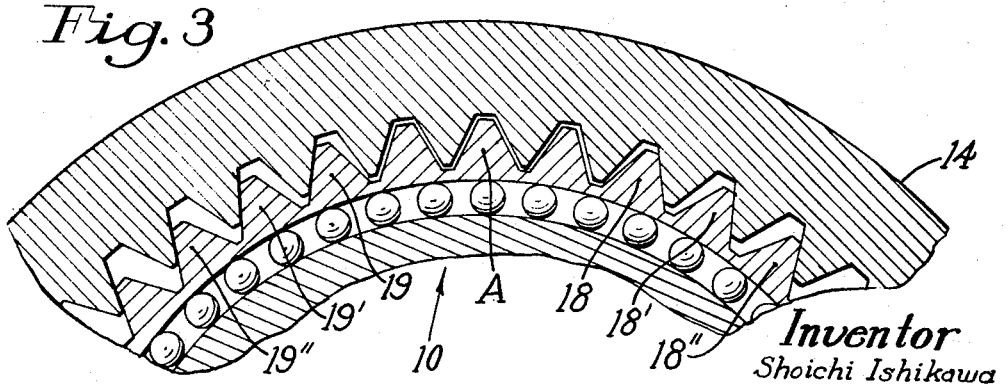
FIG. 3 is a section corresponding to FIG. 2 but wherein the flexspline teeth are in negative displacement or deviation according to the present invention.

An internal rotary, elliptoidal wave generator generally designated 10 and partly shown schematically with its bearing in FIGS. 1–3 has its major axis vertical. Accordingly, as shown in FIG. 1 an externally splined flexspline 12, which may be connected to an output shaft, is elliptoidally deflected and meshes with and reacts on an interally splined, stationary circular spline 14. The spline tooth engagement illustrated in FIG. 1 is that of the known or standard harmonic drive transmission and may be termed "non-deviated." Thus, as shown, at the major axis (the locality designated A), the teeth are fully in mesh without having backlash. In non-deviated harmonic drives, the deflection effected by the wave generator 10 equals the pitch diameter of the output member divided by the reduction ratio. A further characteristic is that this ratio equals the number of teeth on the driven gear divided by the difference in the number of teeth on the driven gear and the number of teeth on the fixed gear, this difference being equal to a multiple of the number of lobes on the wave generator.

In FIGS. 2 and 3, as contrasted with FIG. 1, the flexspline teeth at the apex A along the major axis do not contact the circular spline teeth; instead the tooth engagement point is displaced or deviated to the right side and to the left side from the non-deviated condition, shown in FIG. 1. The distinction is that the non-deviated teeth of FIG. 1 all have the same circular pitch, whereas in FIGS. 2 and 3 the circular pitch of the flexspline teeth differs from those of the circular spline 14. FIG. 2 thus shows positive deviation, a left side flank of a deviated flexspline tooth 16 being in contact with a circular spline tooth, and a right side flank of a deviated flexspline tooth 17 contacting a circular spline tooth. FIG. 3 shows the negative deviation condition, teeth 18, 18' and 18" of the flexspline having their right flanks respectively contacting circular spline teeth, and teeth 19, 19' and 19" respectively having their left flanks contacting the circular spline teeth. These deviated harmonic drive arrangements are due to modifying the flexspline deflection so that, the numbers of teeth of the flexspline and cooperating circular spline being different according to one or a multiple times the number of lobes on the wave generator, there is a difference in the pitch of the flexspline teeth and of the circular spline teeth along the pitch circle.

In the prior art harmonic drive, the amount of radial deflection imposed on the flexspline is a function of the circular pitch, which is the same on both the circular spline and the flexspline. As the wave generator 10 rotates, the circular spline 14 being fixed, the flexspline 12 rotates counter to the flexspline. The curve designated $a$ in FIG. 4 (corresponding to FIG. 20 of the cited Patent 2,959,065) shows, on an enlarged scale, this "non-deviated" flexspline tooth motion with respect to the circular spline. Torque transmitted by the flexspline is generated by the contact surface of its tooth at the major axis (in practice by the several flexspline tooth surfaces adjacent to the major axis). Deflection stress in known harmonic drives is a maximum at the major axis, and total stress at that flexspline locality is increased by the amount of tensile stress due to output torque load. By deviating the tooth contact position to plus or minus positions within a range by modifying the flexspline radial deflection, bending stress can be moderated and other advantageous effects such as longer working life obtained.

Figure 4:
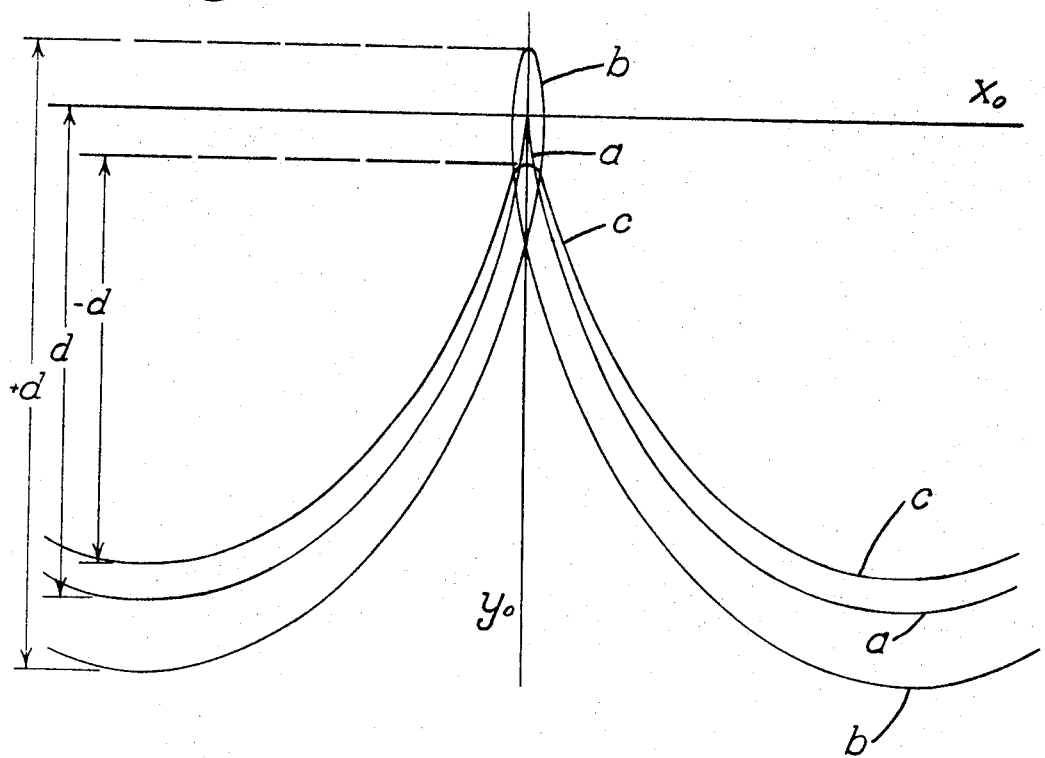
FIG. 4 is a graphic comparison of flexspline tooth motion relative to the circular spline for positively and negatively deviated flexsplines as contrasted with nondeviated or harmonic drive tooth motion hitherto known.

By way of comparison with the known flexspline tooth motion shown in the curve $a$ of FIG. 4 wherein the radial deflection is a standard or non-deviated amount $d$, flexspline tooth motion for a positively deviated harmonic drive such as shown in FIG. 2 is shown by the curve $b$ having deflection $+d$, corresponding tooth motion for a negatively deviated drive as shown in FIG. 3 is illustrated by a curve $c$ of FIG. 4 wherein the deflection is $-d$. With positive deviation, i.e. radial deflection in excess of the standard hitherto used, flexspline teeth are in contact on the way out of mesh when their radial velocity is toward the center. In the case of negative deviation, on the other hand, where the deflection is less than $d$, the flexspline teeth are in contact on the way into mesh, and their radial velocity is then away from center.

In either case of deviated harmonic drive, tooth thickness is modified from the non-deviated design to allow the teeth to shift from a contact position at one side of the apex A to a contact position on the other side. An advantage of the positive deviation arrangement is that it enables usage of a greater tooth height and hence decreases any tendency to tooth ratcheting due to distortion of parts due to load. With negatively deviated arrangement, other relative advantages include: (a) less stress incurred at locality of teeth engagement, (b) permits a lower reduction ratio to be obtained, and (c) allows a smaller cone angle in the flexspline, which is usually cup-shaped, and hence enables shortening its axial length.

Aside from affording greater latitude in the design of harmonic drive actuators and enabling the characteristics of other materials as well as steel to be used effectively, deviated harmonic drive permits more efficiency and economy in the manufacture of reduction gear assemblies in a performance range, as next explained. A single wave generator, for instance an elliptoidal cam having a known radial deflection, may be made in large quantities and each employed in harmonic drive assemblies respectively providing different reduction ratios. For this purpose blank flexsplines and blank circular splines common to all the assemblies would be provided. Then, as the requirement for a specific ratio in the range became known, the appropriate numbers of teeth would be cut in a pair of circular spline and flexspline blanks to be used with the wave generator, the difference in the number of teeth on each blank being selected according to a multiple of the number of lobes on the common wave generator used. In this manner, for example, units having reduction ratios ranging from 50:1 to 200:1 can be assembled from a standardized supply of only the three common elements, i.e. the wave generator and two spline blanks.

Having thus described my invention, what I claim as new and desire to secure by Letters Patent of the United States is:

1. A deviated harmonic drive transmission having a circular spline and a coaxial flexspline radially deflected symmetrically about its center to provide a plurality of lobes having teeth meshing at circumferentially spaced localities, the circular pitch of the flexspline differing from that of the circular spline, and the flexspline having a different number of teeth from those of the circular spline as determined by one or a multiple times the number of said flexspline lobes.

2. A transmission as set forth in claim 1 wherein the circular pitch of the flexspline exceeds that of the circular spline.

3. A transmission as set forth in claim 1 wherein the circular pitch of the flexspline is less than that of the circular spline.

References Cited

UNITED STATES PATENTS

| | | | |
|---|---|---|---|
| 1,644,222 | 10/1927 | Baker | 74—801 |
| 2,043,261 | 6/1936 | Neuland | 74—801 |
| 2,959,065 | 11/1960 | Musser | 74—640 X |

OTHER REFERENCES

"What You Can Do With Nonstandard Spur Gears," by Edward A. Brass in "Product Engineering," July 31, 1961, pages 31–33.

FRED C. MATTERN, JR., *Primary Examiner.*

T. C. PERRY, *Assistant Examiner.*